United States Patent Office 3,287,443
Patented Nov. 22, 1966

3,287,443
PREPARATION OF BLENDS OF VINYL CHLORIDE RESINS AND GRAFT COPOLYMERS OF STYRENE, ACRYLONITRILE AND METHYL METHACRYLATE ONTO DIENE POLYMERS
Kazuo Saito, Masaaki Yoshino, and Shunichi Yoshioka, Kobe, Japan, assignors to Kanegafuchi Chemical Industry Company, Limited, Osaka, Japan, a corporation of Japan
No Drawing. Filed Dec. 16, 1963, Ser. No. 330,642
Claims priority, application Japan, Dec. 24, 1962, 37/58,681; May 17, 1963, 38/24,419
6 Claims. (Cl. 260—876)

This invention relates to methods of manufacturing compounds of the vinyl chloride series.

Compounds of the vinyl chloride series are useful for the production of numerous molded products, as is well known in the art.

Many compounds which include vinyl chloride resins as the principal ingredient thereof, intermixed with various kinds of copolymers have been previously manufactured. An example of one such compound is that which consists of graft-polymerized conjugated diene polymer, styrene and acrylonitrile. However, such previously manufactured compounds and the products produced therefrom have been found to possess certain inferior qualities. For instance, products molded from such previously provided compounds do not possess optimum impact resistance, tensile strength, hardness, transparency and weather resistance. For example, those which did provide a product having optimum transparency failed to provide adequate impact resistance, tensile strength, hardness, and weather resistance, while those which did provide adequate impact resistance, tensile strength, hardness and weather resistance, likewise included various kinds of turbidity and therefore were not transparent. Moreover, some of such previously provided compounds would provide products which would be high in a co-efficient of transmission of visible light rays, but would be poor in haze value, while other of such compounds would provide end products which would be superior in a co-efficient of transmission of visible light ray and haze value, but would be inferior in a co-efficient of transmission of light rays of fractional wave-lengths, with the result that such products would indicate a turbidity of a bluish shade. Furthermore, many of such previously provided compounds provided products which were grossly inferior insofar as weather resistance was concerned.

It is an object of the present invention to provide a method of manufacturing compounds of the vinyl chloride series which will provide an end product possessing properties which have heretofore been deemed incompatible and impossible to generally provide in products formed from compounds of the vinyl chloride series, namely, the properties of toughness, transparency, and weather resistance.

It is a further object of the invention to provide a method of manufacturing compounds of the vinyl chloride series which includes the preparation of an aqueous dispersion including particles selected from the group consisting of a polymer of butadiene, and a copolymer consisting of butadiene-1,3 and a monomer of the mono-olefin series copolymerizable to butadiene-1,3, such particles and mixed monomers consisting of aromatic vinyl, acrylonitrile, and methyl methacrylate being graft-polymerized and the obtained graft-polymerization product and a vinyl chloride resin being admixed to form the compound from which the product is molded.

Other objects and advantages of the invention will become apparent from the following detailed description.

Unless otherwise stated, increments of measurement used in this specification, such as units of percentage or parts, are units by weight.

The base composition of our objective compound is the product comprising particles selected from the group consisting of a polymer of butadiene and a co-polymer consisting of butadiene-1,3 and a monomer of the mono-olefin series copolymerizable to butadiene-1,3. The copolymerization particles preferably consist of 70% or more of butadiene-1,3 and 30% or less monomers of the mono-olefin series. Styrene, acrylonitrile and methyl methacrylate are examples of monomers of the mono-olefin series which may be utilized. It is, of course, to be recognized that other monomers of the mono-olefin series may be used, as is well known in the art. That such copolymerization product contains at least 70% by weight of butadiene-1,3 is important, for when such butadiene content is less than 70% the end molded product produced from the compound will be inferior in toughness, and will have but slight impact resistance.

It is to be recognized that single polymers of the butadiene-1,3 series may be utilized, or that two or more kinds may be intermixed to provide the base composition.

Throughout the remainder of this specification, and in the claims, the base composition above described may be frequently referred to as the "butadiene series product." This term is deemed to include individual butadiene-1,3 polymers, copolymers of butadiene-1,3, and mixtures of the same.

The base composition, that is, the butadiene series product is in particle form and is dispersed in an aqueous solution. Such aqueous dispersion, which includes particles of the butadiene series product, is required in order to perform graft-polymerization, which is the next step of the invention.

The concentration of the particles of the butadiene series product in the dispersion is not absolutely critical. It has been discovered however, through experimentation, that when the concentration is extremely low, productivity will be hampered, while in the case of extremely high concentration, the stability of the aqueous dispersion will be impaired. It is therefore deemed advisable to provide an aqueous dispersion solution in which the particle content thereof is from 10% to 75%, by weight. Optimum results have been obtained when the particle content of the aqueous dispersion is from 30% to 60%, by weight.

Insofar as the present invention is concerned, the diameter of the particles of the butadiene series product dispersed in the aqueous dispersion is particularly important. The diameter of such particles should be from 0.02 to 0.20$\mu$. It is, of course, not an absolute requirement that each and every one of the particles have a diameter of from 0.02$\mu$ to 0.20$\mu$. A fractional quantity of the particles may have a diameter either greater or less than the stated range. We have determined that optimum results are obtained when at least 80% of the particles have a diameter of from 0.02 to 0.20$\mu$. If at least 80% of such particles do not fall within the stated range of diameter, the molded product formed from the compound of the invention will, if more than 20% by weight of them have a particle diameter below 0.02$\mu$, be inferior in toughness, particularly with respect to impact resistance, and if more than 20% of the particles have a diameter in excess of 0.20$\mu$, turbidity will result, whereby the end product will have a low co-efficient of transmission of visible light rays and high haze value, so that its transparency is impaired. This fact was determined by experimentation, carried out as follows:

To an aqueous dispersion containing 40 parts by weight of particles of the butadiene series product (styrene: 23.5%), the diameter of the particles being varied in the experiments, as set forth in Table 1 hereof, was added 60 parts by weight of a monomer mixture consisting of 26% by weight acrylonitrile, 54% by weight styrene, and 20% by weight methyl methacrylate, and graft-polymerization was carried out. 20 parts by weight of the obtained graft-polymerization products and 80 parts by weight of vinyl chloride resin (polymerization degree: 1,000) were mixed and subjected to the molding process, with the results as specified hereinbelow in Table 1.

methacrylate. Graft-polymerization was then carried out and 20 parts by weight of the graft-polymerization product was intermixed with 80 parts by weight of a vinyl chloride resin (polymerization degree: 1,000), and such compound was subjected to the usual molding process, the obtained products being tested with the results as shown in Table 2 hereof.

TABLE 1

| | Particles of 1.3 butadiene series polymer | | Impact strength (kg. cm./cm.$^2$) | Transparency | |
|---|---|---|---|---|---|
| | Dia. of particle ($\mu$) | Percentage | | Coefficient of transmission of visible light (percent) | Haze value (percent) |
| The present invention | 0.02–0.2 | 82 | 60 | 70.9 | 6.8 |
| Control | Over 0.02 | 81 | 28 | 62.8 | 8.2 |
| Do | 0.3–0.6 | 76 | 60 | 48.9 | 43.4 |

NOTES:
1. Impact strength: Izod 23° C. with notch (kg. cm./cm.$^2$).
2. Haze value = Quantity of scattering light/Quantity of transmitted light × 100(%) (JIS-K6714).
3. Transparency: The greater the value of the coefficient of transmission of visible light is, the better. Haze value: The smaller the value is, the better.
4. The values shown in this table and those appearing hereinafter are all obtained by the methods stipulated in the Japanese Industrial Standards, except those which are specially mentioned.

As has been previously noted, the next step in the method of forming compounds according to this invention, after particles of the butadiene series product have been dispersed in aqueous dispersion, is graft-polymerization between the particles of the aqueous dispersion and various mixed monomers. The mixed monomers which we have found to be most acceptable comprise methyl methacrylate, acrylonitrile and aromatic vinyl. Although these particular monomers are set forth in this specification and particularized in the claims, it is to be understood that it is within the scope of our invention and within the scope of the claims to substitute equivalent monomers in place of those particularly set forth.

In the graft-polymerization step of this invention, the particles of the butadiene series product are mixed with the mixed monomers in a ratio of 20 to 70 parts by weight particles of the butadiene series product and 80 to 30 parts by weight mixed monomers. Graft-polymerization is then carried out, the respective monomers of the mixed monomers being graft-polymerized with the particles of the butadiene series product.

The ratio of the particles of the butadiene series product and mixed monomers, is important, for when less than 20 parts particles of the butadiene series product are utilized, the products molded from the objective compound lack toughness, being particularly deficient in impact resistance, and when the quantity of particles of the butadiene series product exceed 70 parts, the end product is inferior in hardness. Accordingly, the ratio of the particles of the butadiene series product and the mixed monomers must be within the limits herein set forth. This has been proven by experimentation carried out as follows:

Various quantities of particles of the butadiene series product (styrene: 23.5%), as set forth in Table 2, were provided in an aqueous dispersion, as previously set forth, in which dispersion 82% of the particles had a particle diameter of from 0.02 to 0.20$\mu$. To such were added mixed monomers consisting of 30% by weight acrylonitrile, 50% by weight styrene, and 20% methyl

TABLE 2

| | Graft-polymerization product | | Impact strength (kg. cm./cm.$^2$) | Hardness |
|---|---|---|---|---|
| | Quantity of 1.3 butadiene series polymers (Parts) | Quantity of mixture of monomers (Parts) | | |
| Present invention | 20 | 80 | 20.7 | 117 |
| | 50 | 50 | 60 | 102 |
| | 60 | 40 | 30 | 83 |
| Control | 15 | 85 | 3.3 | 118 |
| | 70 | 30 | 8.1 | 65 |

NOTES:
1. Impact strength: Izod 23° C. with notch (kg. cm./cm.$^2$).
2. Hardness: (ASTM-D 785-51). The values measured by Rockwell Hardness Tester.

As to the mixed monomers which are to be graft-polymerized to the particles of the butadiene series product, we have determined that optimum results are obtained when such mixed monomers comprise 10% to 45% methyl methacrylate; 10% to 50% acrylonitrile and 30% to 80% aromatic vinyl.

As to the quantity of methyl methacrylate, we determined that when the mixed monomers comprise less than 10% methyl methacrylate, the end product obtained from the objective compound has a bluish turbidity. On the other hand, when the quantity of methyl methacrylate is over 45%, yellowish turbidity will be present in the molded product.

As to the quantity of acrylonitrile, we have determined that when less than 10% is utilized, the end product has a yellowish turbidity and an inferior toughness. When the quantity of acrylonitrile exceeds 50%, fluidity at the time of the thermal molding process is unsatisfactory, and the end molded products have a bluish turbidity and grow opaque. Furthermore, an excess of acrylonitrile disturbs the stability of the aqueous dispersion at the time of graft-polymerization.

As to the aromatic vinyl which is to be selected in practicing our invention, we have found that optimum results are obtained when such aromatic vinyl is selected from the group consisting of styrene, alpha-alkylstyrene and their nucleus-substituted derivatives, or a mixture of two or more of the group consisting of styrene, alpha-alkylstyrene, and their nucleus substituted derivatives. As to nucleus-subtituted derivatives of styrene and alpha-alkylstyrene, we have experimented with vinyl toluene, isopropenyltoluene, and chlorostyrene. It is to be specifically understood that other aromatic vinyls may be substituted for those specifically enumerated above.

Insofar as the quantity of aromatic vinyl is concerned, we have determined that when it is below 30%, a yellowish turbidity is produced in the end product and such end product is opaque. On the other hand, when the aromatic vinyl exceeds 80%, a bluish turbidity in the end product is generated, with a marked drop in toughness, particularly with respect to impact resistance.

Accordingly, the make-up of the mixed monomers is to be within the ratio specified hereinabove. This was proven by experimentation. Table 3 indicates such experimental results, in which the molded products tested were obtained by molding compounds consisting of the graft-polymerization product between particles of the butadiene series product in aqueous dispersion (styrene: 23.5%), of which 82% of the particles had a diameter of from 0.02 to 0.20µ, and a mixture of monomers of acrylonitrile, styrene and methyl methacrylate in various ratios of composition, and vinyl chloride resin (polymerization degree: 1,000) at various mixing ratios.

As previously noted, optimum results are obtained when the monomers graft-polymerized with the particles of the butadiene series product are aromatic vinyl, acrylonitrile and methyl methacrylate. Moreover, each of these monomers must be used in such a manner that they are simultaneously graft-polymerized with the particles of the butadiene series product. This finding constitutes one of the basic features of this invention. This was determined by experimentation in which various substitutions were made in the composition of the compound, as follows:

(1) A compound composed of the diene polymerization product and respective single polymerization product of acryolnitrile, styrene, and methyl methacrylate.

(2) A compound consisting of butadiene-1,3-styrene copolymerization product and acrylonitrile-styrene copolymerization product, (3) A compound composed of the copolymerization product of butadiene-1,3 and methyl methacrylate and acrylonitrile styrene copolymerization product, (4) A compound composed of polymerization products obtained by graft-polymerization of butadiene-1,3-polymers and respective monomers of acrylonitrile and styrene.

The molded end products obtained from the above noted compounds were found to be decidely lacking in transparency, toughness and weather resistance, as compared with the products obtained through use of the compounds of the present invention.

Insofar as graft-polymerization is concerned, the usual emulsification method may be used in practicing our invention. The pH of the graft-polymerization system is important, and we have determined that the pH range

TABLE 3

|  | 1.3 butadiene series polymerization product (parts) | Mixture of monomers | | | | Corresponding compounds | |
|---|---|---|---|---|---|---|---|
|  |  | Quantity of mixture of monomers (parts) | Acrylonitrile (Percent) | Styrene (Percent) | Methyl methacrylate (Percent) | Quantity of graftpolymerization product (parts) | Vinyl chloride resin (parts) |
| Present invention | 35 | 65 | 10 | 80 | 10 | 40 | 60 |
|  | 50 | 50 | 10 | 60 | 30 | 20 | 80 |
|  | 40 | 60 | 10 | 45 | 45 | 25 | 75 |
|  | 50 | 50 | 15 | 40 | 45 | 20 | 80 |
|  | 50 | 50 | 30 | 60 | 10 | 20 | 80 |
|  | 50 | 50 | 25 | 55 | 20 | 20 | 80 |
|  | 40 | 60 | 25 | 30 | 45 | 25 | 75 |
|  | 50 | 50 | 50 | 30 | 20 | 30 | 70 |
|  | 50 | 50 | 40 | 40 | 20 | 20 | 80 |
|  | 50 | 50 | 50 | 40 | 10 | 10 | 90 |
|  | 40 | 60 | 48 | 37 | 15 | 20 | 80 |
| Control | 50 | 50 | 30 | 30 | 40 | 20 | 80 |
|  | 50 | 50 | 30 | 65 | 5 | 20 | 80 |
|  | 50 | 50 | 50 | 50 | 0 | 20 | 80 |
|  | 50 | 50 | 45 | 22 | 33 | 20 | 80 |
|  | 40 | 60 | 8 | 70 | 22 | 25 | 75 |
|  | 50 | 50 | 8 | 42 | 50 | 25 | 75 |
|  | 50 | 50 | 9 | 82 | 9 | 20 | 80 |

|  | Izod impact strength (kg. cm./cm.²) | Transparency | | | Coefficient of transmission at respective wave-lengths | | | | |
|---|---|---|---|---|---|---|---|---|---|
|  |  | Coefficient of transmission of visible light ray (Percent) | Haze value (Percent) | Visual transparency | 400 mµ | 450 mµ | 500 mµ | 550 mµ | 600 mµ |
| Present invention | 60 | 62.0 | 7.3 | Transparent | 45.0 | 51.0 | 66.7 | 70.1 | 71.7 |
|  | 60 | 68.5 | 5.0 | do | 47.0 | 52.0 | 63.2 | 66.5 | 66.8 |
|  | 60 | 68.5 | 4.3 | do | 50.0 | 60.5 | 66.0 | 68.1 | 70.2 |
|  | 60 | 69.1 | 4.7 | do | 51.8 | 62.0 | 67.8 | 66.0 | 68.6 |
|  | 60 | 70.3 | 4.1 | do | 43.0 | 56.0 | 69.5 | 73.0 | 73.2 |
|  | 60 | 70.4 | 4.4 | do | 56.0 | 66.8 | 68.2 | 68.0 | 68.2 |
|  | 60 | 70.1 | 5.4 | do | 49.1 | 57.0 | 65.7 | 69.4 | 72.3 |
|  | 60 | 69.3 | 7.8 | do | 49.8 | 56.1 | 65.3 | 69.2 | 71.1 |
|  | 55.2 | 70.2 | 5.3 | do | 53.2 | 56.5 | 67.0 | 68.2 | 70.2 |
|  | 60 | 50.3 | 7.4 | do | 52.1 | 57.1 | 62.2 | 67.4 | 69.1 |
|  | 60 | 70.4 | 4.4 | do | 51.0 | 57.7 | 63.2 | 66.5 | 66.8 |
|  | 60 | 69.5 | 4.9 | do | 59.0 | 66.5 | 64.5 | 65.2 | 67.0 |
| Control | 40 | 53.8 | 15.4 | Bluish turbidity | 13.5 | 34.7 | 56.8 | 64.0 | 67.0 |
|  | 8.5 | 50.1 | 11.2 | do | 2.0 | 14.5 | 36.0 | 52.2 | 63.0 |
|  | 21.0 | 39.5 | 13.0 | Opaque | 29.0 | 26.5 | 24.5 | 25.0 | 27.0 |
|  | 5.5 | 33.8 | 10.7 | Yellowish turbidity | 3.2 | 22.2 | 47.0 | 41.5 | 40.0 |
|  | 40 | 29.1 | 16.7 | do | 41.8 | 42.0 | 49.8 | 46.0 | 46.8 |
|  | 6.4 | 53.8 | 11.0 | Bluish turbidity | 5.8 | 28.2 | 59.7 | 63.1 | 67.3 | should be from 4.0 to 9.5 with a range of 6.0 to 8.0 being optimum. It was determined that when the pH was either over 9.5 or below 4.0, the methyl methacrylate will be effected by hydrolysis, whereby methacrylic acid is produced. Likewise, if the pH inside of the graft-polymerization system is not within the range specified, the aqueous dispersion becomes unstable, thereby generating coagulations in the system. The usual emulsification-dispersion agents may be utilized in the graft-polymerization system. We have determined that the most suitable of these agents are the surface activators, such as sodium alkylbenzenesulfonate and sodium ester lauryl-sulfate.

As previously stated, the obtained graft-polymerization product consists of approximately 20 to 70 parts by weight of particles of the butadiene series product and 80 to 30 parts by weight of the mixed monomer composition. In such graft-polymerization, we believe that the molecular chain of the copolymerization product of the three kinds of mixed monomers are chemically bonded to the butadiene series product, the resultant molecules having characteristics which differ from either the butadiene series product or the mixed monomer molecules.

The next step in the practicing of our invention is mixture of the graft-polymerization product with a resin of the vinyl chloride series. Throughout this specification and claims thereof, whenever we refer to a "resin of the vinyl chloride series," the same should be interpreted to denote either one or a mixture of individual polymers of vinyl chloride and a copolymerization product consisting of more than 70% by weight vinyl chloride and monomers of the mono-olefin series which are copolymerizable with vinyl chloride for example, one or more of vinyl acetate, vinylidene chloride, acrylic ester, and vinyl-alkyl ether, to name a few.

It is necessary that copolymers of vinyl chloride have a content of vinyl chloride at least 70% by weight, for if such content is below 70%, the quantity of the counterpart polymerizing compositions is excessively large, whereby the characteristic as a resin of the vinyl chloride series will be impaired.

Resins of the vinyl chloride series may be used individually, or a mixture of two or more kinds may be utilized.

As to the mixing ratio of the graft-polymerization product with the resin of the vinyl chloride series, optimum results are obtained when the mixture comprises 10 to 40 parts by weight graft-polymerization product and 90 to 60 parts by weight resin of the vinyl chloride series. When the quantity of the resin of the vinyl chloride series exceeds 90 parts, the end molded product is poor in toughness, and when the quantity of the resin of the vinyl chloride series is below 60 parts, the end product is unsatisfactory in hardness.

According to the teachings of our invention, the mixing ratio of the graft-polymerization product and the resin of the vinyl chloride series should be as above specified. This was experimentally proven as set forth in the following Tables 4 and 5. Table 4 gives the results of a toughness test of the molded products obtained by molding with compounds consisting of a graft-polymerization product comprising the aqueous dispersion of 50 parts by weight of the butadiene series product (styrene: 23.5%), of which 82% of the particles had a diameter of from 0.02 to 0.20$\mu$, mixed monomers consisting of 30% by weight acrylonitrile, 50% by weight styrene and 20% by weight methyl methacrylate, a resin of the vinyl chloride series being added at various ratios, as noted in the tables.

TABLE 4

| | Compounds | | Impact strength (kg. cm./cm.$^2$) | Hardness (Rockwell R) | Tensile strength (kg./cm.$^2$) |
|---|---|---|---|---|---|
| | Graft polymerization products (parts) | Vinyl chloride resin (parts) | | | |
| Present invention | 10 | 90 | 60 | 117 | 642 |
| | 20 | 80 | 60 | 109 | 457 |
| | 30 | 70 | 60 | 92 | 396 |
| | 40 | 60 | 60 | 90 | 303 |
| Control | 2.5 | 97.5 | 4.1 | 120 | 728 |
| | 5.0 | 95.0 | 4.4 | 121 | 699 |
| | 7.5 | 92.5 | 4.9 | 121 | 696 |
| | 50 | 50 | 43 | 79 | 260 |

In Table 5 is shown the result of the weather resistance test of the molded product of compounds produced in various ratios of mixtures made of graft-polymerization products and a resin of the vinyl chloride series, by changing the mixing ratio of monomers in various ways.

TABLE 5

| | Graft-polymerization product | | | | | Quantity of graft polymerization product (parts) | Quantity of vinyl chloride resin (parts) | Weather-proof value after projection/value before projection×100 | |
|---|---|---|---|---|---|---|---|---|---|
| | Composition of mixture of monomer (percent) | | | Quantity of mixture of monomers (parts) | Quantity of 1.3 butadiene polymerization (parts) | | | | |
| | Acrylonitrile | Styrene | Methyl methacrylate | | | | | Tensile strength (percent) | Elongation (percent) |
| Present invention | 28.6 | 57.1 | 14.3 | 70 | 30 | 10 | 90 | 106 | 83 |
| | 28.6 | 57.1 | 14.3 | 70 | 30 | 20 | 80 | 107 | 97 |
| | 28.6 | 57.1 | 14.3 | 70 | 30 | 40 | 60 | 105 | 91 |
| | 24.3 | 47.1 | 28.6 | 70 | 30 | 10 | 90 | 103 | 73 |
| | 24.3 | 47.1 | 28.6 | 70 | 30 | 20 | 80 | 104 | 115 |
| | 24.3 | 47.1 | 28.6 | 70 | 30 | 40 | 60 | 105 | 100 |
| Control | 34.3 | 65.7 | 0 | 70 | 30 | 10 | 90 | 109 | 44 |
| | 34.3 | 65.7 | 0 | 70 | 30 | 20 | 80 | 115 | 40 |
| | 34.3 | 65.7 | 0 | 70 | 30 | 40 | 60 | 108 | 51 |

NOTE: The weather-proof test was carried out by the projection of ultraviolet ray at 40° C. for 60 hours by means of the carbon arc generator, the results being as aforementioned.

As to the method of obtaining the objective compound by homogeneously mixing both the resin of the vinyl chloride series and the graft-polymerization product, the Banbury mixing method, roll-mixing method, powder-mixing method, and the method of mixing both compounds in the form of aqueous dispersion, may be adopted.

Specific examples of compounds formulated in accordance with our invention are as follows:

*Example 1*

| Ingredient: | Quantity, by weight, parts |
|---|---|
| Butadiene-1,3 | 75 |
| Styrene | 25 |
| Oleic acid | 3 |
| Caustic soda | 0.04 |
| Potassium chloride | 0.55 |
| Sodium ethylenediaminetetracetate | 0.02 |
| Ferrous sulfate | 0.005 |
| Sodium sulfoxylate formaldehyde | 0.1 |
| Diisopropylbenzenehydroperoxide | 0.1 |
| Teritary dodecylmercaptan | 0.2 |
| Water | 76 |

The ingredients above noted were charged in a pressure-resistant enclosed agitating polymerizing machine, and were stirred at 5° C. for 39 hours, so as to effect emulsification-polymerization, and an aqueous dispersed solution (to be called latex hereinafter) was obtained. This latex was then treated in a vacuum and the unreacted monomers were recovered.

Observing this latex by electron microscope, it was confirmed that more than 80% of its particles had diameters within the range of 0.05 to 0.15μ.

Next, graft-polymerization was carried out as follows:

Latex containing 50 parts by weight of butadiene-1,3 polymerization product were taken out, to which deoxidated distilled water containing sodium alkylbenzenesulfonate was added for 1 part, so that the total water volume would be 160 parts.

Mixed monomers were then prepared, the mixture comprising:

| Ingredient: | Quantity, by weight, parts |
|---|---|
| Acrylonitrile | 13 |
| Styrene | 27 |
| Methyl methacrylate | 10 |
| Diisopropylbenzenehydroperoxide | 0.2 |
| Tertiary mixed mercaptan | 0.6 |

Five percent by weight, of these mixed monomers was added to the latex taken of and, after the system was deoxydized, it was agitated at 60° C. for 30 minutes, under a nitrogen gas flow.

Then, a mixture consisting of the following ingredients was added:

| Ingredient: | Quantity, by weight, parts |
|---|---|
| Dextrose | 0.2 |
| Ferrous sulfate | 0.0025 |
| Disodium ethylenediaminetetraacetate | 0.01 |
| Water | 20 |

The remaning 95%, by weight, quantity of the mixed monomers were continuously added in 6 hours while maintaining the temperature at 60° C., after which the temperture was maintained for another 2 hours. At this moment, an emulsion of 2.6 ditertiary butyl-para-cresol, which is an age resistor for polymerization products of the butadiene-1,3 series, was added. Then sodium chloride and hydrochloric acid were added so as to solidify the system. After heating the system to cause the particles to coagulate, filtering, warm water rinsing, and drying followed.

To the obtained graft-polymerization product, was added single-polymerized vinyl chloride resin (polymerization degree: 1,000) at various ratios, as shown in Table 6, to which 3 parts of dialkyl tin mercaptide was mixed, and the mixture was kneaded by a roll-mill at 150° C. for 10 minutes. The obtained sheet was placed in the metal mold and pressed at a pressure of 200 kg./cm.² at 160° C., thereby obtaining a sample piece.

Table 6 indicates the characteristics of the respective compounds.

TABLE 6.—RATIO OF COMPOSITIONS AND VARIOUS CHARACTERISTICS OF COMPOUNDS

| Compounds | Present Invention | | | Control | |
|---|---|---|---|---|---|
| | A | B | C | D | E |
| Vinyl chloride resin (parts) | 90 | 80 | 60 | 100 | 0 |
| Graft-polymerization products (parts) | 10 | 20 | 40 | 0 | 100 |
| Impact strength Izod 23° C. with notch (kg. cm./cm.²) | 60 | 60 | 60 | 2.8 | 60 |
| Tensile strength (kg./cm.²) | 642 | 457 | 396 | 653 | 164 |
| Tensile strength (Weather-proof test): Tensile strength after projection/Tensile strength before projection, percent | 103 | 104 | 105 | | |
| Elongation (percent) | 47 | 38 | 96 | 50 | 192 |
| Elongation (Weather-proof test): Elongation after projection/Elongation before projection, percent | 73 | 115 | 100 | | |
| Hardness (Rockwell R) | 117 | 109 | 92 | 121 | 87 |
| Thermal strain temperature (° C.) | 89 | 90 | 92 | 75 | 95 |
| Coefficient of transmission of visible light ray (percent) | 81.0 | 70.7 | 61.3 | 81.0 | 47.8 |
| Haze value (percent) | 4.1 | 5.8 | 6.3 | 6.4 | 6.7 |

As above noted, the obtained compounds had optimum characteristics with respect to impact strength, tensile strength and hardness.

The compound B of Table 6 was taken as a sample, and the co-efficients of transmission of light rays were tested at respective wave lengths, by means of Beckmann's spectrophotometer, the results being as given in Table 7 below.

TABLE 7

| Name of compound | Wave length (mμ) | | | | |
|---|---|---|---|---|---|
| | 400 | 450 | 500 | 550 | 600 |
| Compound B | 60.0 | 67.1 | 68.1 | 68.0 | 68.3 |

As noted in Table 7, it was found that compounds of the present invention have high co-efficients of transmission of light rays through all wave lengths, providing a high degree of transparency which meets the objective of the present invention.

*Example 2*

Separate latices were prepared to contain 50 parts by weight of butadiene-1,3 polymer and 50 parts of butadiene-1,3 acrylonitrile polymerization product, of which 80% of the particles were within the range of particle diameter of 0.05 to 0.1μ, to which deoxidized distilled water containing sodium alkylbenzenesulfonate was added for 1 part, so that the total water volume was 160 parts. Then the following were made to polymerize in the same manner as set forth in Example 1, whereby graft-polymerization products were obtained respectively.

| Ingredient: | Quantity, by weight, parts |
|---|---|
| Acrylonitrile | 13 |
| Styrene | 27 |
| Methyl methacrylate | 10 |

To 20 parts by weight of the obtained polymerization product was mixed 80 parts by weight of single-polymerized vinyl chloride resin (polymerization degree: 1,000), and various tests were conducted in the same manner as Example 1, the results being set forth in Table 8.

TABLE 8

| Items measured | Compound from poly-1,3 butadine | Compound from copolymerization product of 1.3 butadiene-acrylonitrile |
|---|---|---|
| Impact strength (kg.cm./cm.$^2$) | 60 | 60 |
| Tensile strength (kg./cm.$^2$) | 580 | 603 |
| Elongation (percent) | 63 | 111 |
| Hardness (Rockwell R) | 107 | 115 |
| Coefficient of transmission of visible light ray (percent) | 62.3 | 69.0 |
| Haze value (percent) | 8.9 | 9.2 |

*Example 3*

25 parts by weight of the graft-polymerization product obtained from the butadiene-1,3 styrene copolymerization product of Example 1 was mixed with a copolymer (polymerization degree: 900) consisting of 97% by weight vinyl chloride and 3% by weight vinyl acetate. This compound was subjected to tests in the same manner as Example 1 and the following results were obtained:

| | |
|---|---|
| Impact strength Izod (kg. cm./cm.$^2$) | 57.0 |
| Tensile strength (kg./cm.$^2$) | 561 |
| Elongation (percent) | 72 |
| Hardness (Rockwell R) | 103 |
| Coefficient of transmission of visible light rays (percent) | 71.2 |
| Haze value (percent) | 5.6 |

Various changes may be made to the methods herein described, without departing from the spirit of the invention or scope of the following claims.

We claim:

1. A method of manufacturing compositions of the vinyl chloride series which comprises utilizing an aqueous dispersion of polymer particles selected from the group consisting of a homopolymer of butadiene-1,3 and copolymers consisting of at least 70% by weight of butadiene-1,3 and up to 30% by weight of monoethylenically unsaturated compounds copolymerizable therewith, at least 80% by weight of the dispersion particles of the polymer having a particle diameter of from 0.02 to 0.2 microns; polymerizing a monomeric mixture in the aqueous dispersion at a pH of from 4.0 to 9.5 and at weight ratios of 80 to 30 parts monomeric mixture to 20 to 70 parts of the particles in the system, the monomeric mixture consisting of 10% to 50% by weight acrylonitrile monomer, 30% to 80% by weight vinyl aromatic hydrocarbon monomer, and 10% to 45% by weight methyl methacrylate monomer; and admixing 10 to 40 parts by weight of the obtained graft polymerization product with 90 to 60 parts by weight of resin of the vinyl chloride series which is selected from the group consisting of homopolymers of vinyl chloride and copolymerization products of at least 70% by weight vinyl chloride and up to 30% by weight monomers of ethylenically unsaturated compounds copolymerizable therewith.

2. The method as specified in claim 1 wherein the monomeric mixture is polymerized in the aqueous dispersion at a pH of from 6.0 to 8.0.

3. The method as specified in claim 1 wherein the concentration of the aqueous dispersion is such as to comprise a particle content of from 10% to 75% by weight.

4. The method as specified in claim 1 wherein the vinyl aromatic hydrocarbon monomer is selected from the group consisting of styrene, alpha-alkystyrene, nucleus substituted derivatives of styrene, nucleus substituted derivatives of alpha-alkylstyrene, and mixtures thereof.

5. The method as specified in claim 1 wherein the monomers of monoethylenically unsaturated compounds copolymerizable with butadiene-1,3 are selected from the group consisting of styrene, acrylonitrile, methyl methacrylate, and mixtures thereof.

6. The method as specified in claim 1 wherein the monomers of ethylenically unsaturated compounds copolymerizable with vinyl chloride are selected from the group consisting of vinyl acetate, vinylidene chloride, acrylic ester, vinylalkyl ether, and mixtures thereof.

References Cited by the Examiner

FOREIGN PATENTS 841,889  7/1960  Great Britain.
850,487  10/1960  Great Britain.

OTHER REFERENCES

Whitby, Synthetic Rubber, pub. by Wiley & Sons, New York (1954), page 652 relied upon, copy in Scient. Lib.

MURRAY TILLMAN, *Primary Examiner.*

G. F. LESMES, *Assistant Examiner.*